April 28, 1936.                A. BRAULT                 2,039,141
                GAUGE AND METHOD OF MAKING THE SAME
                        Filed Dec. 29, 1934

WITNESSES
Edw. Thorpe
John H. Slocum

INVENTOR
Andora Brault
BY
Munn, Anderson & Liddy.
ATTORNEYS

Patented Apr. 28, 1936

2,039,141

UNITED STATES PATENT OFFICE 2,039,141

GAUGE AND METHOD OF MAKING THE SAME

Andora Brault, Springfield, Mass., assignor to Joseph E. Kerigan, Springfield, Mass.

Application December 29, 1934, Serial No. 759,785

4 Claims. (Cl. 33—174)

This invention relates to gauges, and more particularly to precision gauge blocks and other precision gauges where a high degree of accuracy is essential. At the present time precision gauge blocks are made from steel and from Swedish iron. The process of making these blocks is a long and tedious one and requires a high degree of skill. The blocks are first sized, lapped, and then slowly tempered through a process requiring approximately 14 months. Not only is great care in the selection of materials essential, but a high degree of skill is necessary to produce an accurate block.

The blocks produced by the known methods have in some instances been made accurate to within several one-millionths of an inch. However, to maintain the accuracy of these instruments they must be used at predetermined temperatures and under the most exacting conditions. Moreover, over a period of years, the blocks change in size and shape due to molecular action. In certain types of work precision blocks and similar gauges become magnetized and their efficiency is materially decreased. Naturally, due to the great care necessary in preparation, the amount of time involved, and the materials used, precision gauges, and more particularly precision gauge blocks, are so expensive that the average factory or machine shop cannot afford them.

An object of this invention is to provide a gauge and a method for making the same which will be more accurate and less susceptible to variation from atmospheric and molecular action and temperature changes than any heretofore made.

Another object is to provide a gauge which will not be subject to magnetism and which may be used under all conditions without regard to temperature or the type of work on which it is used.

A still further object is to provide a gauge with the hardest surface possible, and one which is not susceptible to damage and wear and which may be easily and efficiently repaired.

The accompanying drawing illustrates the various steps in the production of a precision gauge block made in accordance with my invention.

Figure 1:
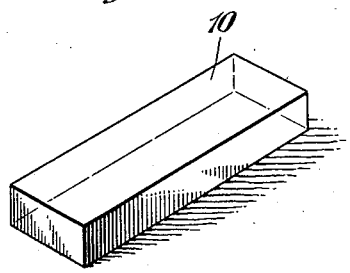
Fig. 1 is a view of a glass block.
Figure 2:
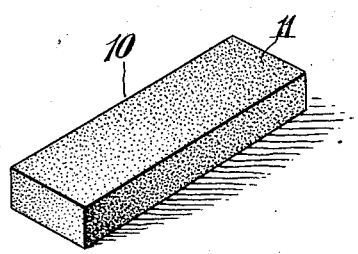
Fig. 2 shows the block in the course of preparation, ready to receive a metal coating.
Figure 3:
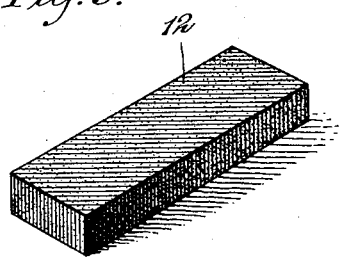
Fig. 3 shows a block coated with metal.

In the production of a precision gauge block in accordance with my invention, a glass block 10 of dimensions slightly under those desired in the finished product is sandblasted or otherwise treated to produce a roughened surface 11 as shown in Fig. 2. I then usually wash the block with a strong solution of soda ash and boiling water in order to remove any impurities. The block is then sprayed with a metal from a spray gun which sprays metal at a temperature of about 3500 to 3600 degrees Fahrenheit. The block is thus coated with the metal and is given a complete and conductive coating of any desired thickness. This provides a casing 12 which shrinks around the block and fuses with it. While the block may be sprayed with any suitable method or with any type of metal, I find that Invar steel, which is a type of chromium nickel steel, is the most adaptable. This is true because the coefficient of expansion of Invar steel is zero throughout the range of normal atmospheric temperatures. I also find that the use of a borosilicate crown glass block or core makes a more efficient block. This is due to the fact that the coefficient of expansion of borosilicate crown glass is very low, approximately .00000325 per degree centigrade.

Figure 4:
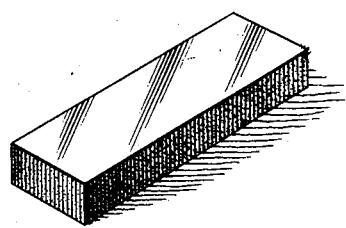
Fig. 4 shows a finished block ground and lapped.

The metal coating of the block is then ground to measure and lapped and given absolutely parallel surfaces, as shown in Fig. 4. If desired the block may then be plated with a layer of chromium of any desired thickness, to give it the hardest surface possible.

Figure 5:
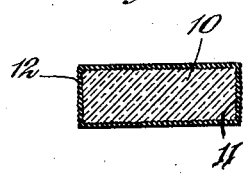
Fig. 5 is a cross sectional view of a finished block.

In Fig. 5 a cross section of the block is shown, illustrating the glass core 10, the roughened surface 11, and the metal casing 12. It will be understood that gauges of other types may be made in the same manner, as well as any other article in which it is desired to have precision and to eliminate to the minimum any expansion or contraction of the substances used. It will also be understood that any type of glass which is adaptable to the purpose may be used, but it is obvious that substances having very little molecular movement and low coefficients of expansion are more efficient.

In the spraying of the metal on the glass a natural tempering process takes place which avoids the necessity of subjecting the gauge to further hardening processes which would cause molecular changes in the structure of the materials. Moreover, the use of a non-metallic core makes a more serviceable gauge and one of longer life since, while producing a gauge having a very low coefficient of expansion, it also produces a non-magnetic gauge even though encased in a metallic casing.

It is within the contemplation of this invention to manufacture not only precision gauge blocks similar to those shown in the drawing but also other measuring instruments, such as rules and similar devices, which must be accurate from one- to five-millionths of an inch.

I claim:

1. A gauge comprising a vitreous block and an outer casing of metal fused thereto.

2. A precision gauge block of definite dimensions comprising a glass block entirely encased in metal.

3. A precision instrument comprising a glass body and an outer casing of metal, said casing being ground and lapped to definite dimensions.

4. A precision instrument comprising a glass body of substantially accurate dimensions and an outer coating of metal fused thereto, said coating being ground and lapped to accurate dimensions.

ANDORA BRAULT.